United States Patent
Baldemair et al.

(10) Patent No.: US 12,101,781 B2
(45) Date of Patent: Sep. 24, 2024

(54) HARQ HANDLING FOR SINGLE-DCI MULTI-SLOT SCHEDULING

(71) Applicant: Telefonaktiebolaget LM Ericsson (publ), Stockholm (SE)

(72) Inventors: Robert Baldemair, Solna (SE); Sina Maleki, Malmö (SE); Niklas Andgart, Södra Sandby (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 474 days.

(21) Appl. No.: 17/420,188

(22) PCT Filed: Dec. 10, 2019

(86) PCT No.: PCT/SE2019/051261
§ 371 (c)(1),
(2) Date: Jul. 1, 2021

(87) PCT Pub. No.: WO2020/141994
PCT Pub. Date: Jul. 9, 2020

(65) Prior Publication Data
US 2022/0095351 A1    Mar. 24, 2022

Related U.S. Application Data

(60) Provisional application No. 62/787,952, filed on Jan. 3, 2019.

(51) Int. Cl.
*H04W 72/12*    (2023.01)
*H04L 1/18*    (2023.01)
(Continued)

(52) U.S. Cl.
CPC ........... *H04W 72/23* (2023.01); *H04L 1/1812* (2013.01); *H04L 1/1822* (2013.01);
(Continued)

(58) Field of Classification Search
CPC .... H04W 72/23; H04L 1/1812; H04L 1/1822; H04L 1/1854; H04L 1/1864; H04L 1/1887; H04L 5/0055; H04L 5/0007
(Continued)

(56) References Cited

U.S. PATENT DOCUMENTS

2013/0176920 A1    7/2013  Seo et al.
2018/0019843 A1*   1/2018  Papasakellariou .... H04L 1/1896
(Continued)

FOREIGN PATENT DOCUMENTS

CN        103339893 A       10/2013
CO        15135531          9/2015
WO        2018158923 A1     9/2018

OTHER PUBLICATIONS

International Search Report and Written Opinion dated Mar. 16, 2020 for International Application No. PCT/SE2019/051261 filed Dec. 10, 2019, consisting of 10-pages.
(Continued)

*Primary Examiner* — Candal Elpenord
(74) *Attorney, Agent, or Firm* — Weisberg I.P. Law, P.A.

(57) ABSTRACT

A network node causes transmission of DCI that includes information for scheduling two or more TBs over two or more communication slots. The two or more TBs are associated with two or more HARQ process IDs. The information includes one or more of: a PUCCH resource indicator configured to indicate at least one resource for use for transmitting HARQ feedback related to the two or more TBs; a DAI configured to indicate a position of HARQ feedback related to the two or more TBs, in a HARQ codebook; a HARQ process ID indicator indicating two or more HARQ process IDs; and one or more NDIs configured to indicate whether at least one of the two or more TBs is a retransmission.

20 Claims, 10 Drawing Sheets

(51) Int. Cl.
    H04L 1/1812    (2023.01)
    H04L 1/1822    (2023.01)
    H04L 1/1829    (2023.01)
    H04L 5/00      (2006.01)
    H04W 72/23     (2023.01)
(52) U.S. Cl.
    CPC .......... *H04L 1/1854* (2013.01); *H04L 1/1864* (2013.01); *H04L 5/0055* (2013.01)
(58) Field of Classification Search
    USPC .................................................. 370/329–330
    See application file for complete search history.

(56) References Cited

U.S. PATENT DOCUMENTS

| | | | |
|---|---|---|---|
| 2019/0045489 A1* | 2/2019 | He | H04W 72/12 |
| 2019/0215104 A1* | 7/2019 | Salem | H04W 80/02 |
| 2019/0253986 A1* | 8/2019 | Jeon | H04L 5/0048 |
| 2020/0221428 A1* | 7/2020 | Moon | H04B 7/088 |
| 2020/0374044 A1* | 11/2020 | Lei | H04W 72/23 |

OTHER PUBLICATIONS

3GPP TS 38.212 V15.3.0; 3rd Generation Partnership Project; Technical Specification Group Radio Access Network; NR; Multiplexing and channel coding (Release 15), Sep. 2018, consisting of 99-pages.
3GPP TS 38.214 V15.3.0; 3rd Generation Partnership Project; Technical Specification Group Radio Access Network; NR; Physical layer procedures for data (Release 15), Sep. 2018, consisting of 96-pages.
3GPP TSG RAN WG1 Meeting #94bis R1-1812775; Title: Consideration on scheduling enhancement for NB-IoT; Agenda Item: 6.2.2.3; Source: ZTE; Document for: Discussion and Decision; Date and Location: Nov. 12-16, 2018, Spokane, USA, consisting of 8-pages.
3GPP TSG RAN WG1 Meeting #94bis R1-1813688; Title: Scheduling of multiple DL/UL TBs for eMTC; Agenda Item: 6.2.1.3; Source: Intel Corporation; Document for: Discussion and Decision; Date and Location: Nov. 12-16, 2018, Spokane, USA, consisting of 4-pages.
3GPP TSG-RAN WG1 Meeting #95 R1-1813757; Title: Summary on Multiple TB scheduling enhancement for NB-IoT; Agenda Item: 6.2.2.3; Source: ZTE; Document for: Discussion and Decision; Date and Location: Nov. 12-16, 2018, Spokane, USA, consisting of 11-pages.
3GPP TS 38.213 V15.3.0; 3rd Generation Partnership Project; Technical Specification Group Radio Access Network; NR; Physical layer procedures for control (Release 15), Sep. 2018, consisting of 101-pages.
Japanese Office Action and English Summary dated Sep. 27, 2022 for Application No. 2021-538227, consisting of 8 pages.
3GPP TSG-RAN WG1 Meeting #90bis R1-1718853; Title: Summary of DL/UL scheduling and HARQ management; Agenda item: 7.3.3.2; Source: Qualcomm Incorporated; Document for: Discussion/Decision; Location and Date: Prague, Czech Republic; Oct. 9-13, 2017, consisting of 14 pages.
3GPP TSG-RAN WG1 Meeting #94bis Tdoc R1-1810187;Title: Scheduling of multiple DL/UL transport blocks in LTE-MTC; Agenda Item: 6.2.1.3; Source: Ericsson; Document for: Discussion and Decision; Location and Date: Chengdu, P.R. China, Oct. 8-12, 2018, consisting of 8 pages.
Chinese Office Action and English Summary dated Jan. 9, 2024 for Application No. 201980087322.5 consisting of 11 pages.
Colombian Office Action and English Summary Translation dated Feb. 26, 2024 for Application No. NC2021/0009672 consisting of 18 pages.

* cited by examiner

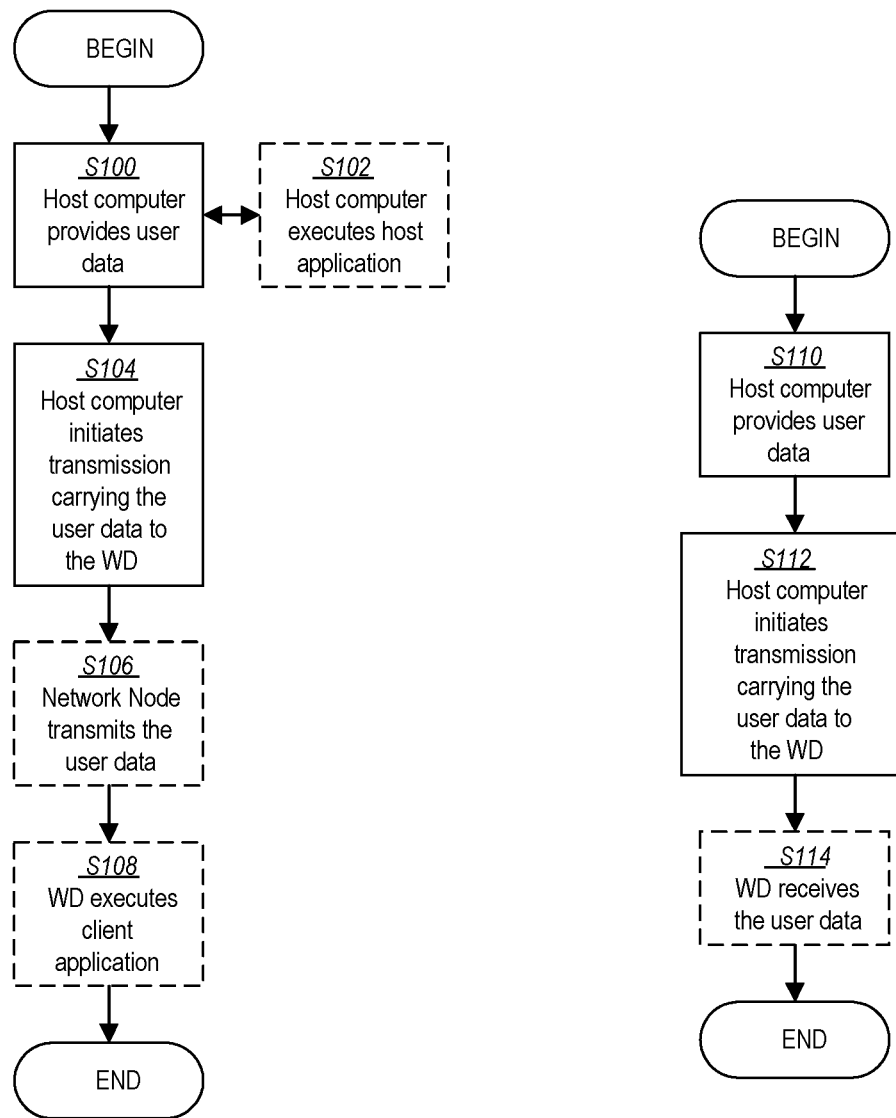

FIG. 14

HARQ HANDLING FOR SINGLE-DCI MULTI-SLOT SCHEDULING

CROSS-REFERENCE TO RELATED APPLICATIONS

This application is a Submission Under 35 U.S.C. § 371 for U.S. National Stage Patent Application of International Application No.: PCT/SE2019/051261, filed Dec. 10, 2019 entitled "HARQ HANDLING FOR SINGLE-DCI MULTI-SLOT SCHEDULING," which claims priority to U.S. Provisional Application No. 62/787,952, filed Jan. 3, 2019, entitled "HARQ HANDLING FOR SINGLE-DCI MULTI-SLOT SCHEDULING," the entireties of both of which are incorporated herein by reference.

TECHNICAL FIELD

Wireless communication and in particular, to configuring control information for scheduling a plurality of transport blocks over a plurality of communication slots associated with at least one Hybrid Automatic Repeat Request (HARQ) instance.

BACKGROUND

The New Radio (NR) (also known as "5G") standard of the Third Generation Partnership Project (3GPP) is being designed to help provide service for multiple use cases such as enhanced mobile broadband (eMBB), ultra-reliable and low latency communication (URLLC), and machine type communication (MTC). Each of these services has different technical requirements. For example, the general requirement for eMBB is high data rate with moderate latency and moderate coverage, while URLLC service requires a low latency and high reliability transmission but perhaps for moderate data rates.

One of the solutions for low latency data transmission is shorter transmission time intervals. In NR, in addition to transmission in a slot, a mini-slot transmission is also allowed to reduce latency. A mini-slot (in NR terminology called Type B scheduling) may include any number of 1 to 14 OFDM symbols in the uplink (UL) and 2, 4 or 7 symbols in the downlink (DL) (in 3GPP Release 15 (Rel-15)). It should be noted that the concepts of slot and mini-slot are not specific to a specific service, meaning that a mini-slot may be used for either eMBB, URLLC, or other services. FIG. 1 is a diagram of an exemplary radio resource in NR.

Physical Channels

A downlink physical channel corresponds to a set of resource elements carrying information originating from higher layers, i.e., transmission layers. The following example downlink physical channels are defined:
Physical Downlink Shared Channel, PDSCH;
Physical Broadcast Channel, PBCH; and
Physical Downlink Control Channel, PDCCH.

PDSCH is the main physical channel used for unicast downlink data transmission, but also for transmission of RAR (random access response), certain system information blocks (SIBs), and paging information. PBCH carries the basic system information, required by the wireless device to access the network and to read remaining system information in SIB 1. PDCCH is used for transmitting downlink control information (DCI), mainly scheduling decisions, required for reception of PDSCH, and for uplink scheduling grants enabling transmission on PUSCH.

An uplink physical channel corresponds to a set of resource elements carrying information originating from higher layers. The following example uplink physical channels are defined:
Physical Uplink Shared Channel, PUSCH;
Physical Uplink Control Channel, PUCCH; and
Physical Random Access Channel, PRACH.

PUSCH is the uplink counterpart to the PDSCH. PUCCH is used by wireless devices to transmit uplink control information, including HARQ acknowledgments, channel state information reports, etc. PRACH is used for random access preamble transmission.

An example of contents of a DL DCI 1-0 is provided below.

Example contents of a DCI format 1_0 with CRC scrambled by C-RNTI/CS_RNTI
Identifier for DCI formats—1 bits
The value of this bit field is may always set to 1, indicating a DL DCI format
Frequency domain resource assignment—$\lceil \log_2(N_{RB}^{DL,BWP}(N_{RB}^{DL,BWP}+1)/2) \rceil$ bits
$N_{RB}^{DL,BWP}$ is the size of the active DL bandwidth part in case DCI format 1_0 is monitored in the wireless device specific search space and satisfying
the total number of different DCI sizes configured to monitor is no more than four for the cell, and
the total number of different DCI sizes with C-RNTI configured to monitor is no more than three for the cell
otherwise, $N_{RB}^{DL,BWP}$ is the size of a control resource set (CORESET) 0.
Time domain resource assignment—4 bits, for example, as defined in Subclause 5.1.2.1 of 3GPP Technical Specification (TS) 38.214
VRB-to-PRB mapping—1 bit, for example, according to Table 7.3.1.1.2-33 in, for example, 3GPP TS 38.214
Modulation and coding scheme—5 bits, for example, as defined in Subclause 5.1.3 of 3GPP TS 38.214
New data indicator—1 bit
Redundancy version—2 bits, for example, as defined in Table 7.3.1.1.1-2 in, for example, 3GPP TS 38.214
HARQ process number—4 bits
Downlink assignment index (DAI)—2 bits, for example, as defined in Subclause 9.1.3 of 3GPP TS 38.213, as counter DAI
TPC command for scheduled PUCCH—2 bits, for example, as defined in Subclause 7.2.1 of 3GPP TS 38.213
PUCCH resource indicator—3 bits, for example, as defined in Subclause 9.2.3 of 3GPP TS 38.213
PDSCH-to-HARQ feedback timing indicator—3 bits, for example, as defined in Subclause 9.2.3 of 3GPP TS 38.213

Slot Aggregation DL:
When the wireless device is configured with aggregationFactorDL >1, the same symbol allocation is applied across the aggregationFactorDL consecutive slots. The wireless device may expect that the transport block (TB) is repeated within each symbol allocation among each of the aggregationFactorDL consecutive slots and the PDSCH is limited to a single transmission layer.

If the wireless device procedure for determining slot configuration, for example, as defined in Subclause 11.1 of 3GPP TS 38.213 determines symbol of a slot allocated for PDSCH as uplink symbols, the transmission on that slot is omitted for multi-slot PDSCH transmission.

Slot Aggregation UL:

When the wireless device is configured with aggregation-FactorUL >1, the same symbol allocation is applied across the aggregationFactorUL consecutive slots and the PUSCH is limited to a single transmission layer. The wireless may repeat the TB across the aggregationFactorUL consecutive slots applying the same symbol allocation in each slot.

If the wireless device procedure for determining slot configuration, for example, as defined in subclause 11.1 of 3GPP TS 38.213, determines symbols of a slot allocated for PUSCH as downlink symbols, the transmission on that slot is omitted for multi-slot PUSCH transmission.

Multi-Slot Scheduling:

Within the scheduling information (SI), wireless device packet scheduling (PS) for 3GPP Release 16 (Rel 16), some proposals are made with regard to enabling a PDCCH scheduling occasion to schedule multiple slots (e.g., PDSCH) with the underlying resource indicators, etc. As such, the processing time may be reduced and thereby, the processing time of the wireless device may be reduced which yields power savings. An example of such a mechanism is provided in FIG. 2.

SUMMARY

Some embodiments advantageously provide methods, systems, network nodes, wireless devices and apparatuses for communicating a downlink control information (DCI) for scheduling a plurality of transport blocks over a plurality of communication slots associated with at least one Hybrid Automatic Repeat Request (HARQ) instance, i.e., for handling HARQ instance(s)/process(es).

HARQ handling arrangements for a single-DCI multi-slot scheduling of PxSCH (i.e. PDSCH or PUSCH) arrangements are described where the arrangements schedule multiple TBs over multiple slots. Examples of the underlying components and/or processes of the arrangement(s) including one or more of PUCCH resources, HARQ Codebook, HARQ Process ID and New Data Indicator are described below in detail.

According to one aspect of the disclosure, a network node is provided. The network node includes processing circuitry configured to: cause transmission of downlink control information (DCI) to a wireless device where the DCI includes information for scheduling two or more transport blocks (TBs) over two or more communication slots, the two or more transport blocks are associated with two or more Hybrid Automatic Repeat Request (HARQ) process identifiers (IDs). The information for scheduling includes at least one of: a PUCCH resource indicator configured to indicate at least one resource for the wireless device to use for transmitting HARQ feedback related to the two or more TBs, a Downlink Assignment Indicator (DAI) configured to indicate a position of HARQ feedback related to the two or more TBs, in a HARQ codebook, a HARQ process ID indicator indicating HARQ process IDs, and one or more New Data Indicators (NDIs) configured to indicate whether at least one of the two or more TBs is a retransmission. The processing circuitry is further configured to communicate using the two or more TBs based at least in part on the DCI.

According to one or more embodiments of this aspect, the PUCCH resource indicator includes one or more K1 values. According to one or more embodiments of this aspect, the two or more communication slots are scheduled on corresponding time and frequency resources. According to one or more embodiments of this aspect, the position of HARQ feedback related to the two or more TBs, in the HARQ codebook, is further based at least in part on a quantity of the two or more communication slots. According to one or more embodiments of this aspect, a value of the DAI indicates the position of HARQ feedback for one of the two or more TBs, another position of HARQ feedback for a second of the two or more TBs being indicated based at least in part on the value of the DAI.

According to one or more embodiments of this aspect, the HARQ process ID indicator is based at least in part on a quantity of the two or more communication slots for physical shared channel transmission. According to one or more embodiments of this aspect, the HARQ process ID indicator is based at least in part on at least one slot number of the two or more communication slots for physical shared channel transmission. According to one or more embodiments of this aspect, the HARQ process ID indicator is one of the two or more HARQ process IDs.

According to one or more embodiments of this aspect, the HARQ process ID indicator includes a quantity of HARQ process IDs less than a quantity of the two or more communication slots. According to one or more embodiments of this aspect, the one or more NDIs are configured to indicate whether at least one of the two or more TBs is a retransmission. According to one or more embodiments of this aspect, the one or more NDIs is a single NDI that is applied to the two or more TBs.

According to another aspect of the disclosure, a method in a network node is provided. Transmission is caused of downlink control information (DCI) to a wireless device where the DCI includes information for scheduling two or more transport blocks (TBs) over two or more communication slots. The two or more transport blocks are associated with two or more Hybrid Automatic Repeat Request (HARQ) process identifiers (IDs). The information for scheduling includes one or more of: a PUCCH resource indicator configured to indicate at least one resource for the wireless device to use for transmitting HARQ feedback related to the two or more TBs, a Downlink Assignment Indicator (DAI) configured to indicate a position of HARQ feedback related to the two or more TBs, in a HARQ codebook, a HARQ process ID indicator indicating the two or more HARQ process IDs, and one or more New Data Indicators (NDIs) configured to indicate whether at least one of the two or more TBs is a retransmission. Communication using the two or more TBs is performed based at least in part on the DCI.

According to one or more embodiments of this aspect, the PUCCH resource indicator includes one or more K1 values. According to one or more embodiments of this aspect, the two or more communication slots are scheduled on corresponding time and frequency resources. According to one or more embodiments of this aspect, the position of HARQ feedback related to the two or more TBs, in the HARQ codebook, is further based at least in part on a quantity of the two or more communication slots.

According to one or more embodiments of this aspect, a value of the DAI indicates the position of HARQ feedback for one of the two or more TBs, another position of HARQ feedback for a second of the two or more TBs being indicated based at least in part on the value of the DAI. According to one or more embodiments of this aspect, the HARQ process ID indicator is based at least in part on a quantity of the two or more communication slots for physical shared channel transmission.

According to one or more embodiments of this aspect, the HARQ process ID indicator is based at least in part on at least one slot number of the two or more communication slots for physical shared channel transmission. According to one or more embodiments of this aspect, the HARQ process ID indicator is one of the two or more HARQ process IDs. According to one or more embodiments of this aspect, the HARQ process ID indicator includes a quantity of HARQ process IDs less than a quantity of the two or more communication slots. According to one or more embodiments of this aspect, the one or more NDIs are configured to indicate whether at least one of the two or more TBs is a retransmission. According to one or more embodiments of this aspect, the one or more NDIs is a single NDI that is applied to the two or more TBs.

According to another aspect of the disclosure, a wireless device is provided. The wireless device include processing circuitry configured to receive downlink control information (DCI) where the DCI includes information for scheduling two or more transport blocks (TBs) over two or more communication slots. The two or more transport blocks are associated with two or more Hybrid Automatic Repeat Request (HARQ) process identifiers (IDs). The information for scheduling includes one or more of: a PUCCH resource indicator configured to indicate at least one resource for the wireless device to use for transmitting HARQ feedback related to the two or more TBs, a Downlink Assignment Indicator (DAI) configured to indicate a position of HARQ feedback related to the two or more TBs, in a HARQ codebook, a HARQ process ID indicator indicating the two or more HARQ process IDs, and one or more New Data Indicators (NDIs) configured to indicate whether at least one of the two or more TBs is a retransmission. Communication using the two or more TBs is performed based at least in part on the DCI.

According to one or more embodiments of this aspect, the PUCCH resource indicator includes one or more K1 values. According to one or more embodiments of this aspect, the two or more communication slots are scheduled on corresponding time and frequency resources. According to one or more embodiments of this aspect, the position of HARQ feedback related to the two or more TBs, in the HARQ codebook, is further based at least in part on a quantity of the two or more communication slots. According to one or more embodiments of this aspect, a value of the DAI indicates the position of HARQ feedback for one of the two or more TBs, another position of HARQ feedback for a second of the two or more TBs being indicated based at least in part on the value of the DAI.

According to one or more embodiments of this aspect, the HARQ process ID indicator is based at least in part on a quantity of the two or more communication slots for physical shared channel transmission. According to one or more embodiments of this aspect, the HARQ process ID indicator is based at least in part on at least one slot number of the two or more communication slots for physical shared channel transmission. According to one or more embodiments of this aspect, the HARQ process ID indicator is one of the two or more HARQ process IDs.

According to one or more embodiments of this aspect, the HARQ process ID indicator includes a quantity of HARQ process IDs less than a quantity of the two or more communication slots. According to one or more embodiments of this aspect, the one or more NDIs are configured to indicate whether at least one of the two or more TBs is a retransmission. According to one or more embodiments of this aspect, the one or more NDIs is a single NDI that is applied to the two or more TBs.

According to another aspect of the disclosure, a method implemented by a wireless device is provided. Downlink control information (DCI) is received. The DCI includes information for scheduling two or more transport blocks (TBs) over two or more communication slots. The two or more transport blocks are associated with two or more Hybrid Automatic Repeat Request (HARQ) process identifiers (IDs). The information for scheduling includes one or more of: a PUCCH resource indicator configured to indicate at least one resource for the wireless device (22) to use for transmitting HARQ feedback related to the two or more TBs, a Downlink Assignment Indicator (DAI) configured to indicate a position of HARQ feedback related to the two or more TBs, in a HARQ codebook, a HARQ process ID indicator indicating the two or more HARQ process IDs and one or more New Data Indicators (NDIs) configured to indicate whether at least one of the two or more TBs is a retransmission. The two or more TBs are used to communicate based at least in part on the DCI.

According to one or more embodiments of this aspect, the PUCCH resource indicator includes one or more K1 values. According to one or more embodiments of this aspect, the two or more communication slots are scheduled on corresponding time and frequency resources. According to one or more embodiments of this aspect, the position of HARQ feedback related to the two or more TBs, in the HARQ codebook, is further based at least in part on a quantity of the two or more communication slots. According to one or more embodiments of this aspect, a value of the DAI indicates the position of HARQ feedback for one of the two or more TBs, another position of HARQ feedback for a second of the two or more TBs being indicated based at least in part on the value of the DAI.

According to one or more embodiments of this aspect, the HARQ process ID indicator is based at least in part on a quantity of the two or more communication slots for physical shared channel transmission. According to one or more embodiments of this aspect, the HARQ process ID indicator is based at least in part on at least one slot number of the two or more communication slots for physical shared channel transmission. According to one or more embodiments of this aspect, the HARQ process ID indicator is one of the two or more HARQ process IDs.

According to one or more embodiments of this aspect, the HARQ process ID indicator includes a quantity of HARQ process IDs less than a quantity of the two or more communication slots. According to one or more embodiments of this aspect, the one or more NDIs are configured to indicate whether at least one of the two or more TBs is a retransmission. According to one or more embodiments of this aspect, the one or more NDIs is a single NDI that is applied to the two or more TBs.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 5 is a flowchart illustrating exemplary methods implemented in a communication system including a host computer, a network node and a wireless device for executing a client application at a wireless device according to some embodiments of the present disclosure;

FIG. 6 is a flowchart illustrating exemplary methods implemented in a communication system including a host computer, a network node and a wireless device for receiving user data at a wireless device according to some embodiments of the present disclosure;

FIG. 14 is a diagram of examples of PUCCH resources in each slot for HARQ feedback.

DETAILED DESCRIPTION

Figure 1:
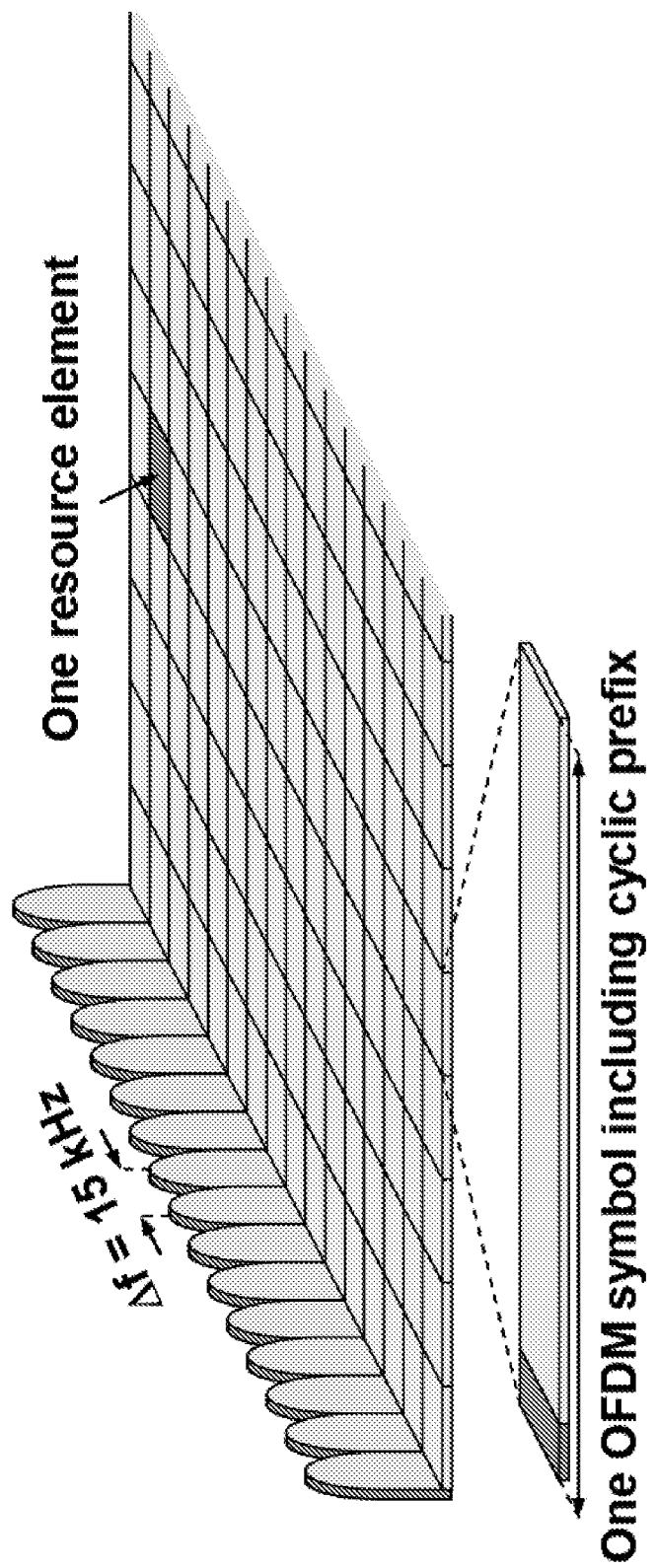
FIG. 1 is a block diagram of a radio resource in New Radio.
Figure 2:
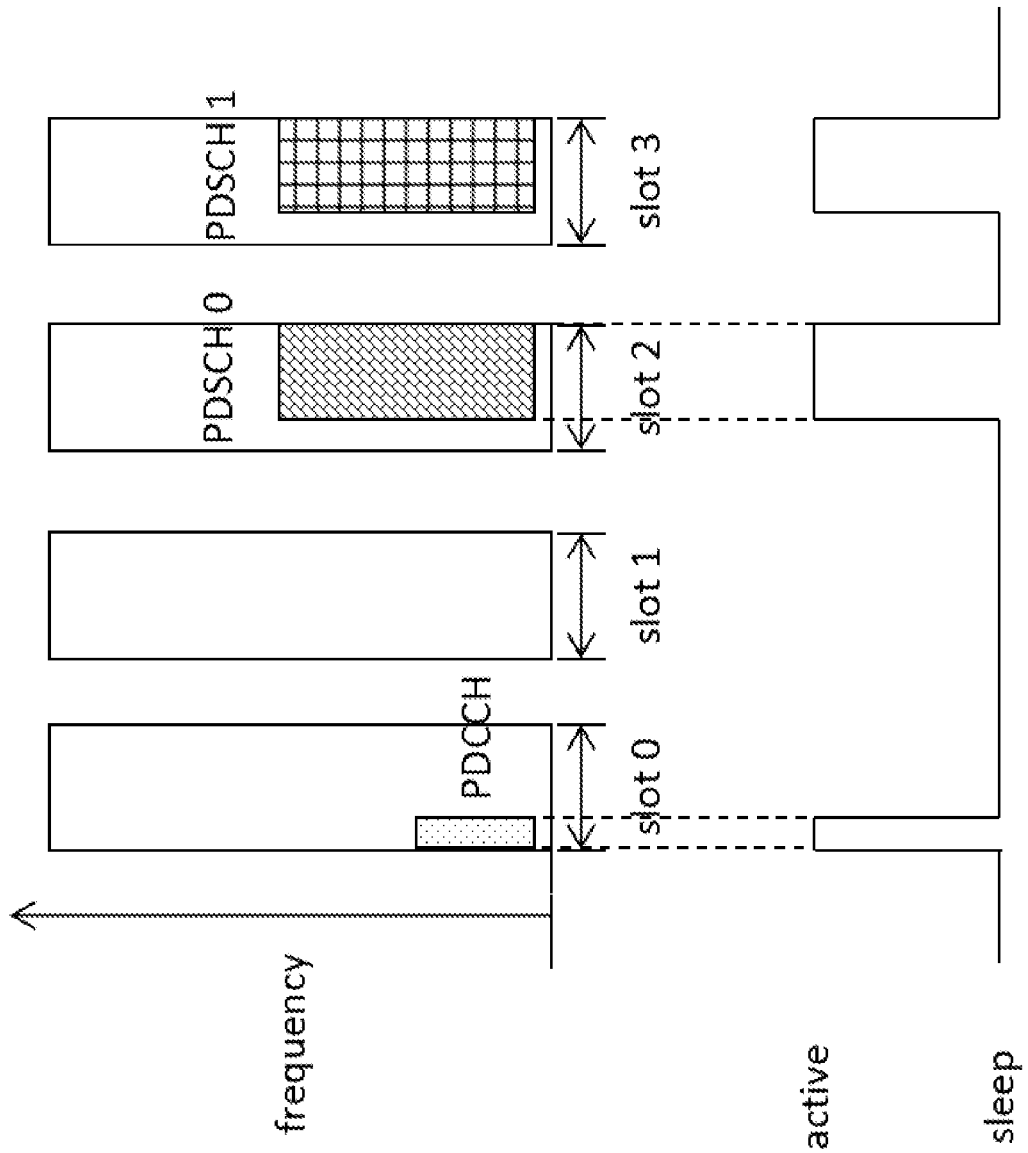
FIG. 2 is an example of multi-slot scheduling.

Multi-slot scheduling mechanisms such as the one illustrated in FIG. 2 rely on a single DCI including the scheduling indication of a number of, e.g., PDSCH slots with each of them potentially having different resource assignment, etc. This disadvantageously leads to a large DCI size which increases the bandwidth burden of the wireless device and increases PDCCH blocking probability.

Slot aggregation, as an established form of multi-slot scheduling in 3GPP Rel-15, does not involve the level of complexity of multi-scheduling mechanisms. However, slot aggregation has some issues which need to be addressed. For example, current slot aggregation mechanisms rely on single layer transmission such that multi-layer transmission is not addressed. Further, current slot aggregation mechanisms communicate only one TB such that the case with multiple TBs is not addressed. Since all slots may contain the same TB, 3GPP Rel-15 slot aggregation may only operate with a single HARQ process and PUCCH resources for a single TB are provided in the DCI. However, this configuration may not be applicable to the case of multi-slot scheduling with different TBs.

Therefore, there is a need for an efficient single DCI multi-slot scheduling mechanism with low complexity which addresses the HARQ handling for the case of multi-slot scheduling with multiple TBs. The disclosure herein provides efficient processes for HARQ handling in the case of single-DCI multi-slot scheduling where multiple TBs are scheduled over the span of multiple slots.

Before describing in detail exemplary embodiments, it is noted that the embodiments reside primarily in combinations of apparatus components and processing steps related to communicating a downlink control information (DCI) for scheduling a plurality of transport blocks over a plurality of communication slots associated with at least one Hybrid Automatic Repeat Request (HARQ) instance. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, integrated access and backhaul (IAB) node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, IAB node, access point, radio access point, Remote Radio Unit (RRU) Remote Radio Head (RRH).

The term resource used herein may correspond to any type of physical resource or radio resource expressed in terms of length of time and/or frequency. Signals are transmitted or received by a radio node over a time resource. Examples of time resources are: symbol, time slot, subframe, radio frame, Transmission Time Interval (TTI), interleaving time, etc.

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices, and/or one or more bit patterns representing the information. It may in particular be considered that control signaling as described herein, based on the utilized resource sequence, implicitly indicates the control signaling type.

Transmitting in downlink may pertain to transmission from the network or network node to the terminal. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular, communication terminating at such. It may be considered that backhaul and/or relay communication and/or network communication is implemented as a form of sidelink or uplink communication or similar thereto.

Configuring a terminal or wireless device or node may involve instructing and/or causing the wireless device or node to change its configuration, e.g., at least one setting and/or register entry and/or operational mode. A terminal or wireless device or node may be adapted to configure itself, e.g., according to information or data in a memory of the terminal or wireless device. Configuring a node or terminal or wireless device by another device or node or a network may refer to and/or comprise transmitting information and/ or data and/or instructions to the wireless device or node by the other device or node or the network, e.g., allocation data (which may also be and/or comprise configuration data) and/or scheduling data and/or scheduling grants. Configuring a terminal may include sending allocation/configuration data to the terminal indicating which modulation and/or encoding to use. A terminal may be configured with and/or for scheduling data and/or to use, e.g., for transmission, scheduled and/or allocated uplink resources, and/or, e.g., for reception, scheduled and/or allocated downlink resources. Uplink resources and/or downlink resources may be scheduled and/or provided with allocation or configuration data.

Data and/or information may refer to any kind of data, in particular any one of and/or any combination of control data or user data or payload data. Control information (which may also be referred to as control data) may refer to data controlling and/or scheduling and/or pertaining to the process of data transmission and/or the network or terminal operation.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments provide communicating a downlink control information (DCI) for scheduling a plurality of transport blocks over a plurality of communication slots associated with at least one Hybrid Automatic Repeat Request (HARM) instance.

Figure 3:
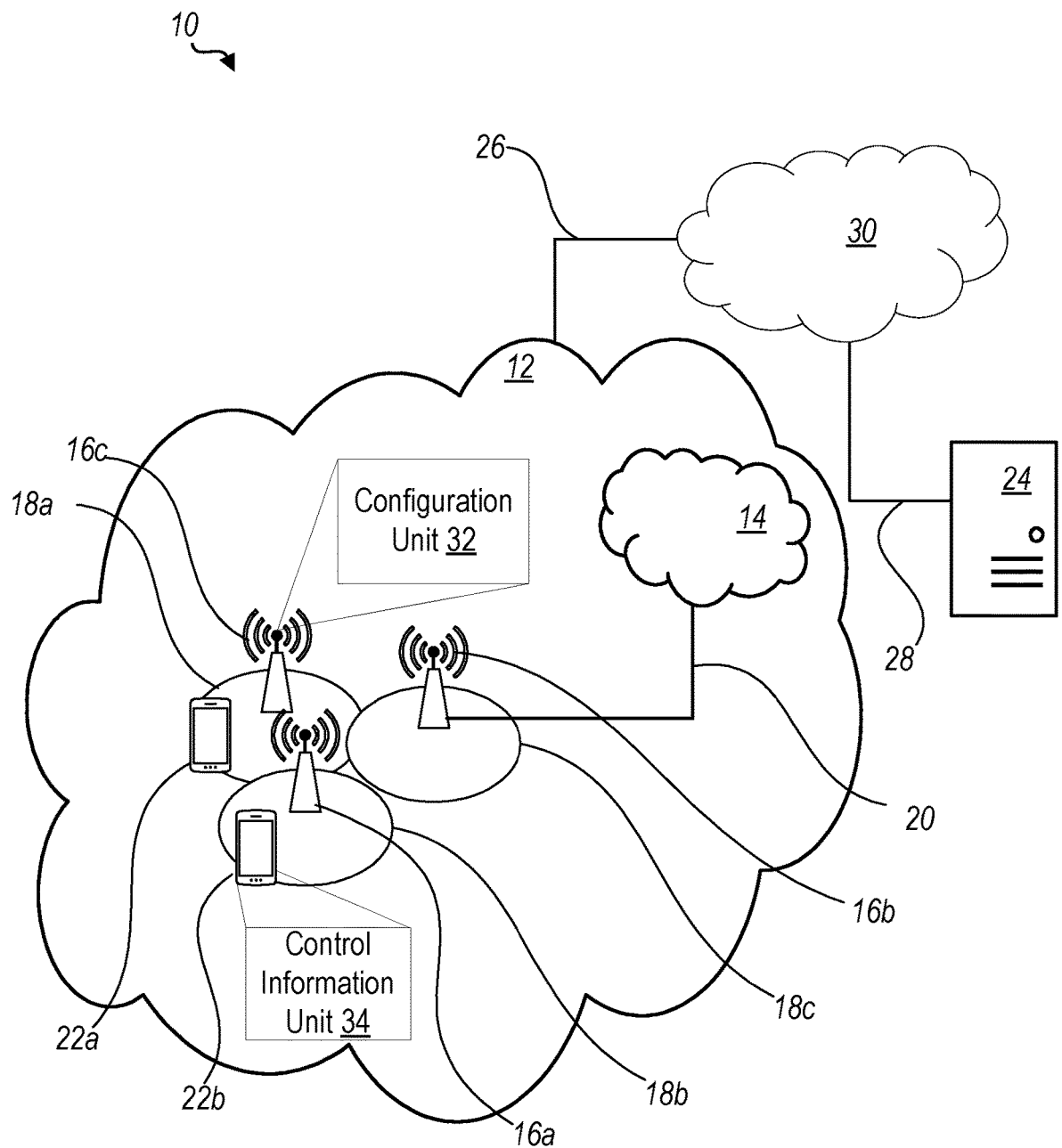
FIG. 3 is a schematic diagram of an exemplary network architecture illustrating a communication system connected via an intermediate network to a host computer according to the principles in the present disclosure.

Referring again to the drawing figures, in which like elements are referred to by like reference numerals, there is shown in FIG. 3 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16c. A second WD 22b in coverage area 18b is wirelessly connectable to the corresponding network node 16a. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 3 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of the routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a configuration unit 32 which is configured to perform one or more functions described herein such as the configuration of control information, i.e., DCI, for multi-slot scheduling that associated with HARQ process(es), i.e., that provides HARQ handling for single-DCI multi-slot scheduling. A wireless device 22 is configured to include a control information unit 34 which is configured to perform one or more functions described herein such as the receiving of control information, i.e., DCI.

Example implementations, in accordance with an embodiment, of the WD 22, network node 16 and host computer 24 discussed in the preceding paragraphs will now be described with reference to FIG. 4. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22. The processing circuitry 42 of the host computer 24 may include an information unit 54 configured to enable the service provider to one or more of providing, forwarding, communicating, determining, receiving, etc. information related to the control information described herein.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by the network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include configuration unit 32 configured to perform one or more functions described herein such as the configuration of control information, i.e., DCI, for multi-slot scheduling that associated with HARQ process(es), i.e., that provides HARQ handling for single-DCI multi-slot scheduling.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a control information unit 34 configured to perform one or more functions described herein such as the receiving of control information, i.e., DCI.

Figure 4:
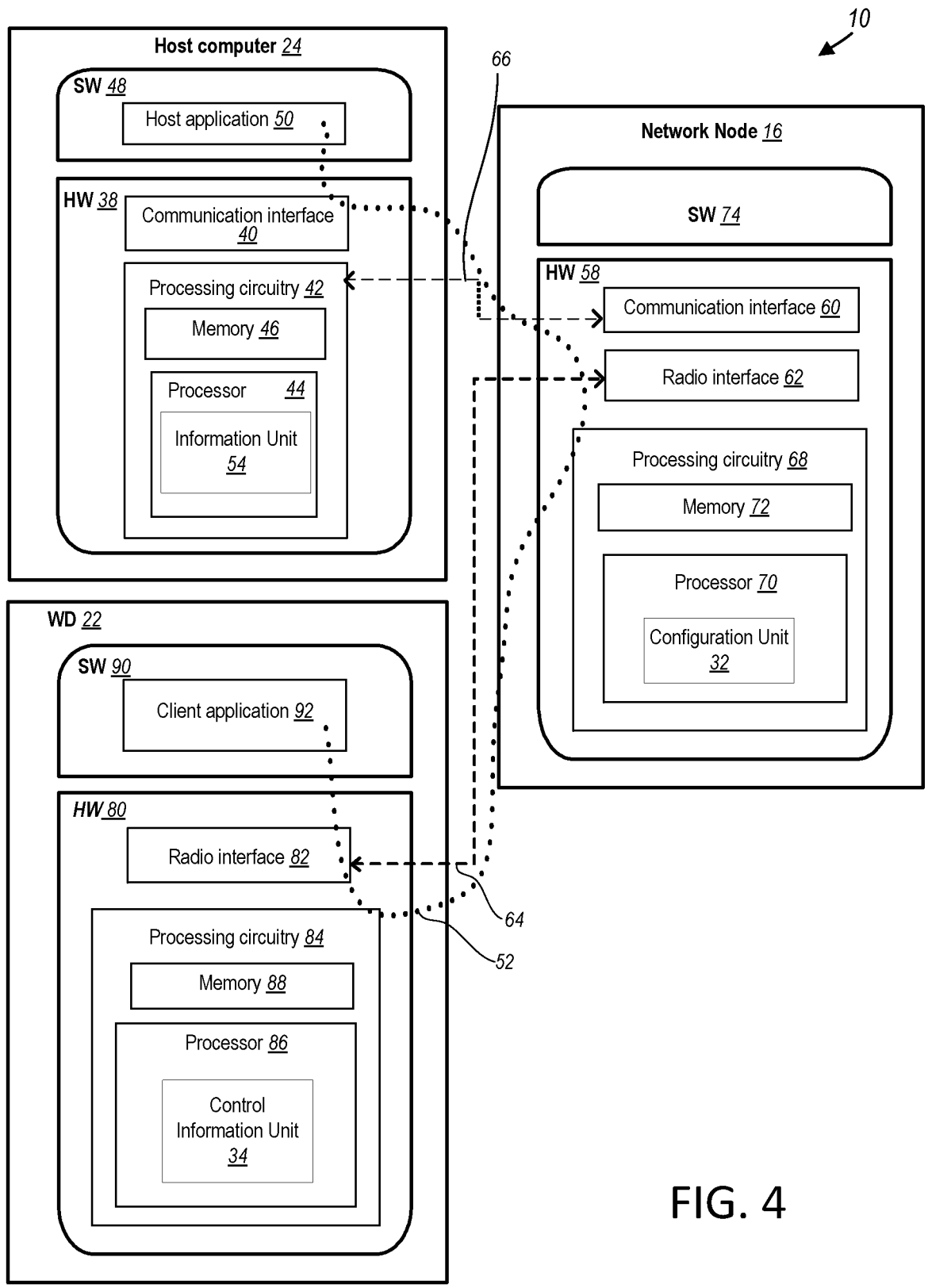
FIG. 4 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 4 and independently, the surrounding network topology may be that of FIG. 3.

In FIG. 4, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors, etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 3 and 4 show various "units" such as configuration unit 32, and control information unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

FIG. 5 is a flowchart illustrating an exemplary method implemented in a communication system, such as, for example, the communication system of FIGS. 3 and 4, in accordance with one embodiment. The communication system may include a host computer 24, a network node 16 and a WD 22, which may be those described with reference to FIG. 4. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 6 is a flowchart illustrating an exemplary method implemented in a communication system, such as, for example, the communication system of FIG. 3, in accordance with one embodiment. The communication system may include a host computer 24, a network node 16 and a WD 22, which may be those described with reference to FIGS. 3 and 4. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figures 7, 8:
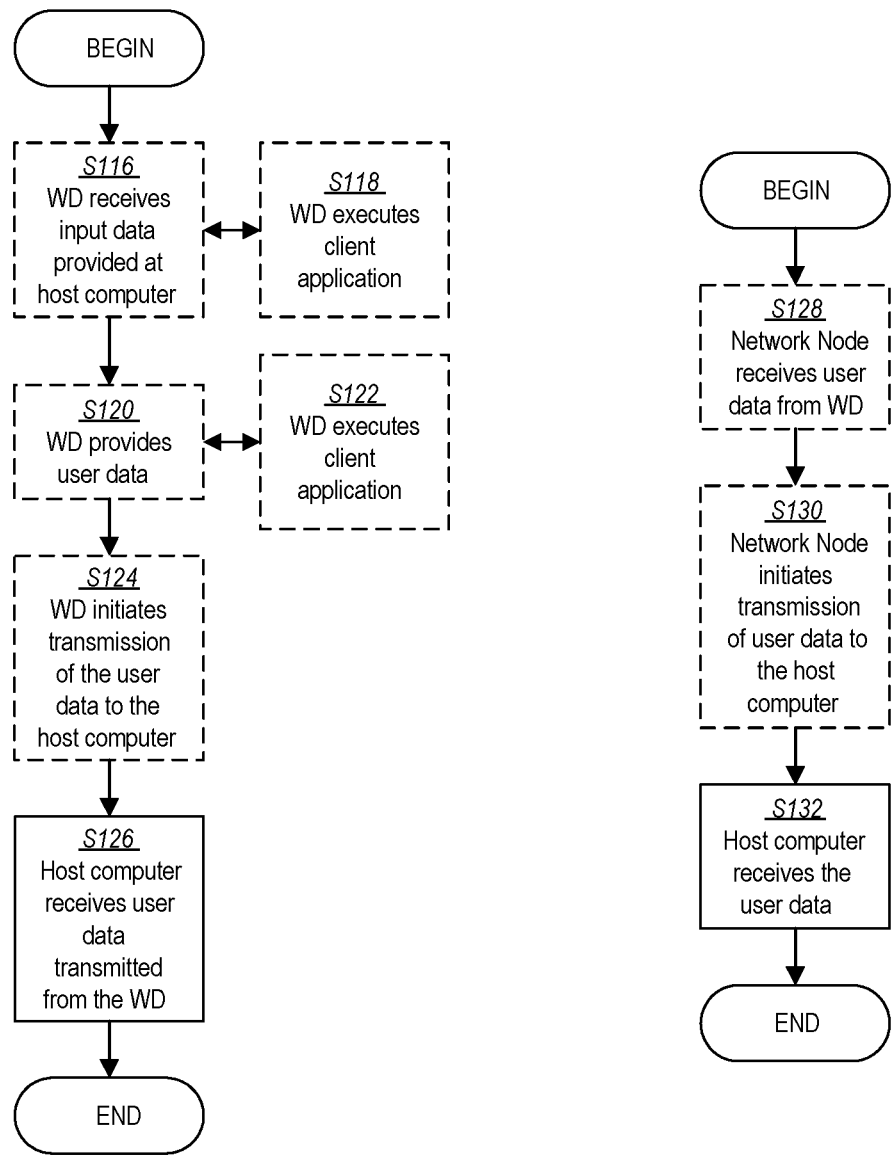
FIG. 7 is a flowchart illustrating exemplary methods implemented in a communication system including a host computer, a network node and a wireless device for receiving user data from the wireless device at a host computer according to some embodiments of the present disclosure.
FIG. 8 is a flowchart illustrating exemplary methods implemented in a communication system including a host computer, a network node and a wireless device for receiving user data at a host computer according to some embodiments of the present disclosure.

FIG. 7 is a flowchart illustrating an exemplary method implemented in a communication system, such as, for example, the communication system of FIG. 3, in accordance with one embodiment. The communication system may include a host computer 24, a network node 16 and a WD 22, which may be those described with reference to FIGS. 3 and 4. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 8 is a flowchart illustrating an exemplary method implemented in a communication system, such as, for example, the communication system of FIG. 3, in accordance with one embodiment. The communication system may include a host computer 24, a network node 16 and a WD 22, which may be those described with reference to FIGS. 3 and 4. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 9:
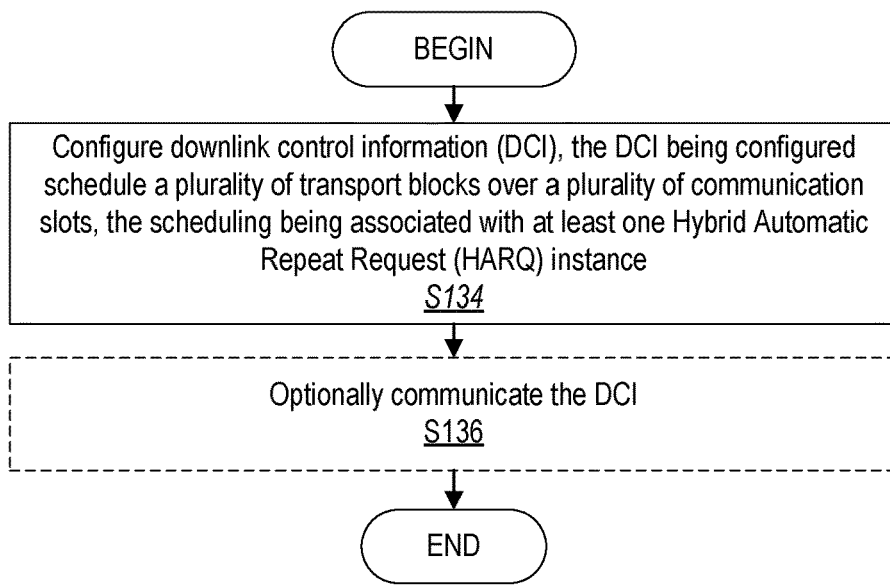
FIG. 9 is a flowchart of an exemplary process in a network node according to some embodiments of the present disclosure.

FIG. 9 is a flowchart of an exemplary process in a network node 16 according to one or more embodiments of the present disclosure. One or more Blocks and/or functions performed by the network node 16 may be performed by one or more elements of the network node 16 such as by configuration unit 32 in processing circuitry 68, processor 70, radio interface 62, etc. In one or more embodiments, network node 16 such as via one or more of processing circuitry 68, processor 70 and radio interface 62 is configured to configure (Block S134) a downlink control information (DCI) where the DCI is configured to schedule a plurality of transport blocks over a plurality of communication slots and where the scheduling is associated with at least one Hybrid Automatic Repeat Request (HARQ) instance. As used herein, "HARQ instance" may be used interchangeably with "HARQ process ID" and/or "HARQ codebook". In one or more embodiments, network node 16 such as via one or more of processing circuitry 68, processor 70 and radio interface 62 is configured to optionally (Block S136) communicate the DCI.

In one or more embodiments, the plurality of communication slots are scheduled on the same (i.e., corresponding) time and frequency resources of a physical shared channel. For example, the time and frequency resources configuration in one communication slot may correspond to the time and frequency resources configuration in at least another of the plurality of communication slot. In one or more embodiments, the plurality of communication slots are used for providing a physical downlink shared channel. In one or more embodiments, the at least one HARQ instance corresponds to a plurality of HARQ instances where the plurality of HARQ instance being transmitted using the same HARQ codebook. In one or more embodiments, the HARQ instance is associated with a New Data Indicator (NDI) bit that is applied to the plurality of transport blocks.

Figure 10:
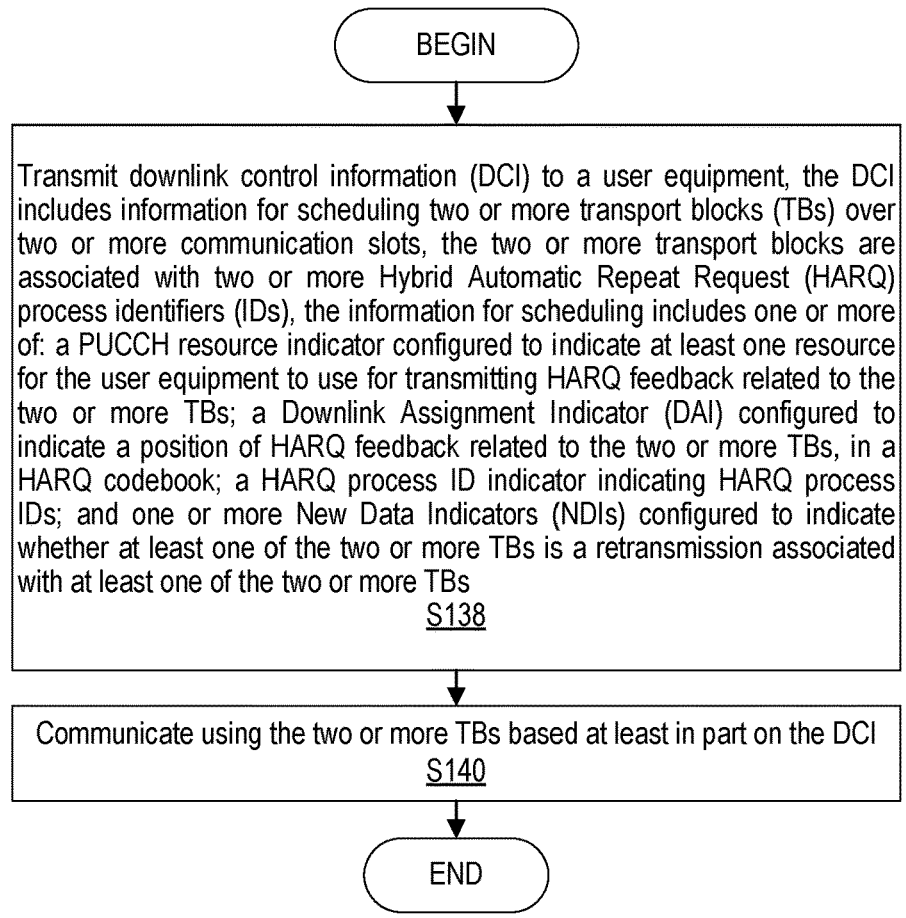
FIG. 10 is a flowchart of another exemplary process a network node according to some embodiments of the present disclosure.

FIG. 10 is a flowchart of another exemplary process in a network node 16 according to one or more embodiments of the present disclosure. One or more Blocks and/or functions performed by the network node 16 may be performed by one or more elements of the network node 16 such as by configuration unit 32 in processing circuitry 68, processor 70, radio interface 62, etc. In one or more embodiments, network node 16 such as via one or more of processing circuitry 68, processor 70 and radio interface 62 is configured to configure cause (Block S138) transmission of downlink control information (DCI) to a wireless device, the DCI includes information for scheduling two or more transport blocks (TBs) over two or more communication slots, the two or more transport blocks are associated with two or more Hybrid Automatic Repeat Request (HARQ) process identifiers (IDs), the information for scheduling includes one or more of: a PUCCH resource indicator configured to indicate at least one resource for the wireless device 22 to use for transmitting HARQ feedback related to the two or more TBs; a Downlink Assignment Indicator (DAI) configured to indicate a position of HARQ feedback related to the two or more TBs, in a HARQ codebook; a HARQ process ID indicator indicating the two or more HARQ process IDs; and one or more New Data Indicators (NDIs) configured to indicate whether at least one of the two or more TBs is a retransmission, as described herein. In one or more embodiments, network node 16 such as via one or more of processing circuitry 68, processor 70 and radio interface 62 is configured to configure communicate (Block S140) using the two or more TBs based at least in part on the DCI, as described herein.

According to one or more embodiments of this aspect, the PUCCH resource indicator includes one or more K1 values. According to one or more embodiments of this aspect, the two or more communication slots are scheduled on corresponding time and frequency resources. According to one or more embodiments of this aspect, the position of HARQ feedback related to the two or more TBs, in the HARQ codebook, is further based at least in part on a quantity of the two or more communication slots. According to one or more embodiments of this aspect, a value of the DAI indicates the position of HARQ feedback for one of the two or more TBs, another position of HARQ feedback for a second of the two or more TBs being indicated based at least in part on the value of the DAI.

According to one or more embodiments of this aspect, the HARQ process ID indicator is based at least in part on a quantity of the two or more communication slots for physical shared channel transmission. According to one or more embodiments of this aspect, the HARQ process ID indicator is based at least in part on at least one slot number of the two or more communication slots for physical shared channel transmission. According to one or more embodiments of this aspect, the HARQ process ID indicator is one of the two or more HARQ process IDs.

According to one or more embodiments of this aspect, the HARQ process ID indicator includes a quantity of HARQ process IDs less than a quantity of the two or more communication slots. According to one or more embodiments of this aspect, the one or more NDIs are configured to indicate whether at least one of the two or more TBs is a retransmission. According to one or more embodiments of this aspect, the one or more NDIs is a single NDI that is applied to the two or more TBs.

Figure 11:
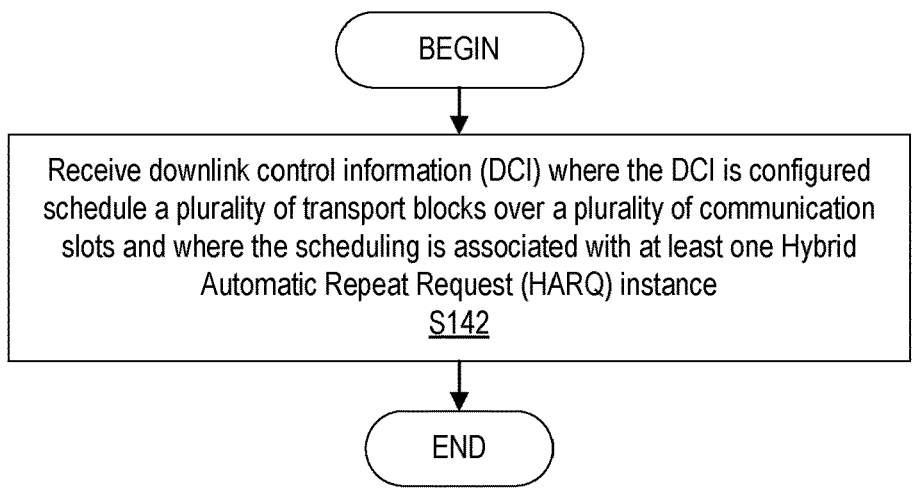
FIG. 11 is a flowchart of an exemplary process in a wireless device according to some embodiments of the present disclosure.

FIG. 11 is a flowchart of an exemplary process in a wireless device 22 according to one or more embodiments of the present disclosure. One or more Blocks and/or functions performed by wireless device 22 may be performed by one or more elements of wireless device 22 such as by control information unit 34 in processing circuitry 84, processor 86, radio interface 82, etc. In one or more embodiments, wireless device 22 such as via one or more of processing circuitry 84, processor 86 and radio interface 82 is configured to configure (Block S142) receive downlink control information (DCI) where the DCI is configured schedule a plurality of transport blocks over a plurality of communication slots and where the scheduling is associated with at least one Hybrid Automatic Repeat Request (HARQ) instance.

In one or more embodiments, the plurality of communication slots are scheduled on the same time and frequency resources of a physical shared channel.

In one or more embodiments, the plurality of communication slots are used for providing a physical downlink shared channel. In one or more embodiments, the at least one HARQ instance corresponds to a plurality of HARQ instances where the plurality of HARQ instance is transmitted using the same HARQ codebook. In one or more embodiments, the HARQ instance is associated with a New Data Indicator (NDI) bit that is applied to the plurality of transport blocks.

Figure 12:
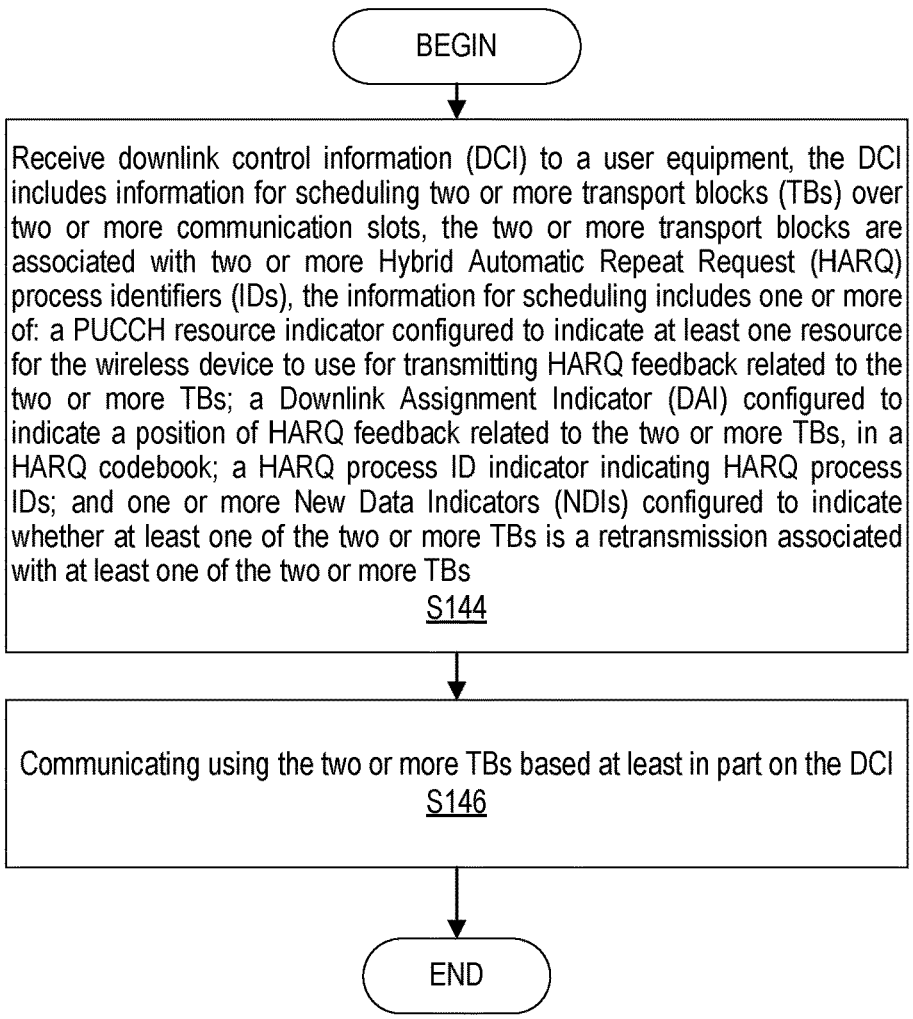
FIG. 12 is a flowchart of another exemplary process in a wireless device according to some embodiments of the present disclosure.

FIG. 12 is a flowchart of another exemplary process in a wireless device 22 according to one or more embodiments of the present disclosure. One or more Blocks and/or functions performed by wireless device 22 may be performed by one or more elements of wireless device 22 such as by control information unit 34 in processing circuitry 84, processor 86, radio interface 82, etc. In one or more embodiments, wireless device 22 such as via one or more of processing circuitry 84, processor 86 and radio interface 82 is configured to receive (Block S144) downlink control information (DCI) where the DCI includes information for scheduling two or more transport blocks (TBs) over two or more communication slots and where the two or more transport blocks are associated with two or more Hybrid Automatic Repeat Request (HARQ) process identifiers (IDs), the information for scheduling includes one or more of: a PUCCH resource indicator configured to indicate at least one resource for the wireless device to use for transmitting HARQ feedback related to the two or more TBs; a Downlink Assignment Indicator (DAI) configured to indicate a position of HARQ feedback related to the two or more TBs, in a HARQ codebook; a HARQ process ID indicator indicating the two or more HARQ process IDs; and one or more New Data Indicators (NDIs) configured to indicate whether at least one of the two or more TBs is a retransmission. In one or more embodiments, wireless device 22 such as via one or more of processing circuitry 84, processor 86 and radio interface 82 is configured to communicate (Block S146) using the two or more TBs based at least in part on the DCI.

According to one or more embodiments of this aspect, the PUCCH resource indicator includes one or more K1 values. According to one or more embodiments of this aspect, the two or more communication slots are scheduled on corresponding time and frequency resources. According to one or more embodiments of this aspect, the position of HARQ feedback related to the two or more TBs, in the HARQ codebook, is further based at least in part on a quantity of the two or more communication slots. According to one or more embodiments of this aspect, a value of the DAI indicates the position of HARQ feedback for one of the two or more TBs, another position of HARQ feedback for a second of the two or more TBs being indicated based at least in part on the value of the DAI.

According to one or more embodiments of this aspect, the HARQ process ID indicator is based at least in part on a quantity of the two or more communication slots for physical shared channel transmission. According to one or more embodiments of this aspect, the HARQ process ID indicator is based at least in part on at least one slot number of the two or more communication slots for physical shared channel transmission. According to one or more embodiments of this aspect, the HARQ process ID indicator is one of the two or more HARQ process IDs.

According to one or more embodiments of this aspect, the HARQ process ID indicator includes a quantity of HARQ process IDs less than a quantity of the two or more communication slots. According to one or more embodiments of this aspect, the one or more NDIs are configured to indicate whether at least one of the two or more TBs is a retransmission. According to one or more embodiments of this aspect, the one or more NDIs is a single NDI that is applied to the two or more TBs.

Embodiments provide for configuring control information for scheduling a plurality of transport blocks over a plurality of communication slots associated with at least one Hybrid Automatic Repeat Request (HARQ) instance. Having generally described arrangements for configuring control information for scheduling a plurality of transport blocks over a plurality of communication slots associated with at least one HARQ instance, details for examples of these arrangements, functions and processes are provided as follows, and which may be implemented by the network node 16, wireless device 22 and/or host computer 24.

Figure 13:
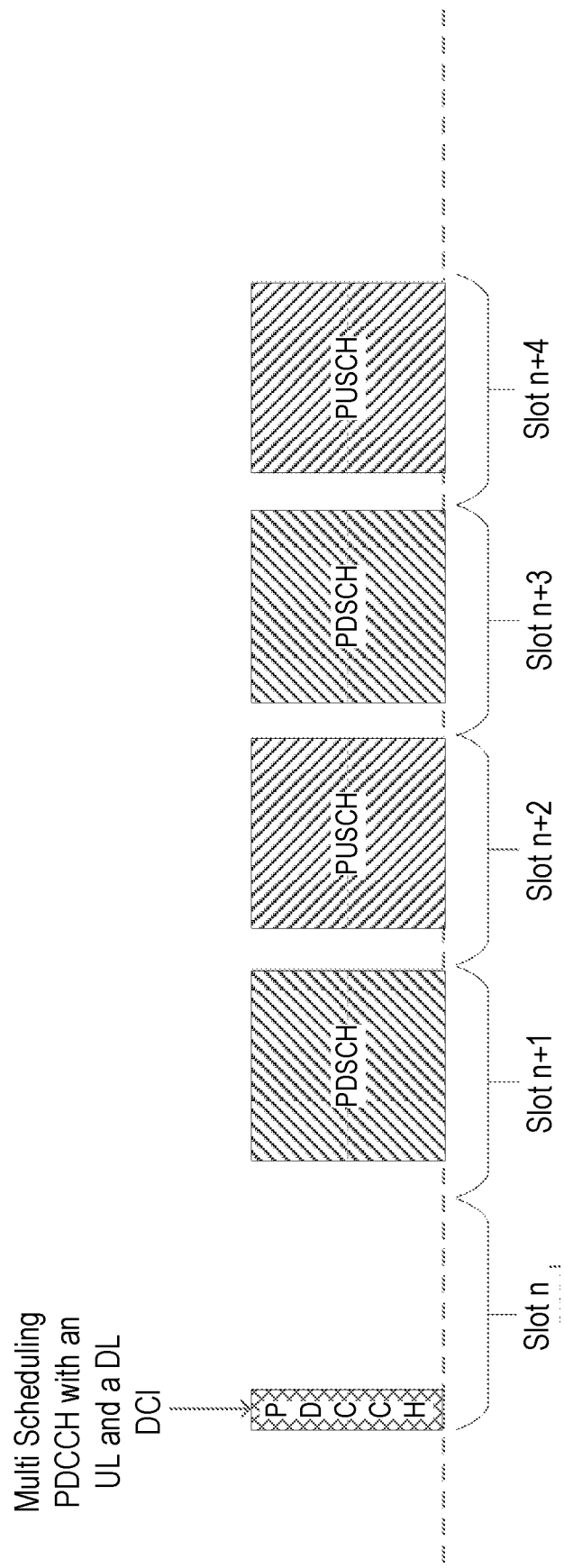
FIG. 13 is a diagram of an example of a multi-slot scheduling PDCCH occasion with a single uplink and a single downlink scheduling DCI.

General Framework of Single-DCI Multi Slot Scheduling:

Multi-slot scheduling is described in which the network node 16 such as via one or more of processing circuitry 68, processor 70, radio interface 62, configuration unit 32, etc. schedules the wireless device 22 using a single DCI, i.e., a type of control information, for multiple slots. Each scheduled slot may have the same time and frequency domain resource assignment for PxSCH (i.e., PDSCH or PUSCH), whereby the network node 16 does not need to send multiple individual assignments. In addition to these, most (in the extreme case all) of the other information in the DCI formats remain the same for all the slots, e.g. MCS, number of layers, antenna ports, carrier indication, etc. FIG. 13 is a diagram of an example of such a single-DCI multi-slot scheduling mechanism. In this specific example, both the DL and the UL are scheduled using single DL/UL DCIs for multiple slots. As used herein, PxSCH may include and/or correspond to one or more TBs. For example, in one or more embodiments, the PDSCH may carry one or more TBs. For PDSCH, if there are two TBs, there may also be two HARQ processes, but the DCI may contain only one HARQ ID such that TB1 may use HARQ IDa while TB2 may use HARQ IDb, where ID is signed in the DCI. In another example, in one or more embodiments, PUSCH may always correspond to a single TB. In another example, in one or more embodiments in the case of re-transmission, there may be another PxSCH using same TB (mapped to the same HARQ process) but in this context the TBs may be considered different.

What may vary between the slots is the HARQ process ID of the associated TB, the PUCCH resource, details related to the HARQ codebook. This is further described below.

What has been described above and the rest of this description about time units counted in slots, can as a generalization be counted e.g. in symbols, or blocks of certain number of symbols. This can be useful when having multi-half-slot scheduling.

HARQ Handling:

PUCCH Resources Section

In one or more embodiments, the PUCCH resources section may only be applicable to DL transmissions.

Because multiple TBs can be potentially sent to the wireless device 22 by the network node 16 such as via one or more of processing circuitry 68, processor 70, radio interface 62, configuration unit 32, etc., it may be useful to have an appropriate HARQ ACK/NACK procedure in place for performing one or more HARQ instances and/or occasions and/or processes.

Figure 14:
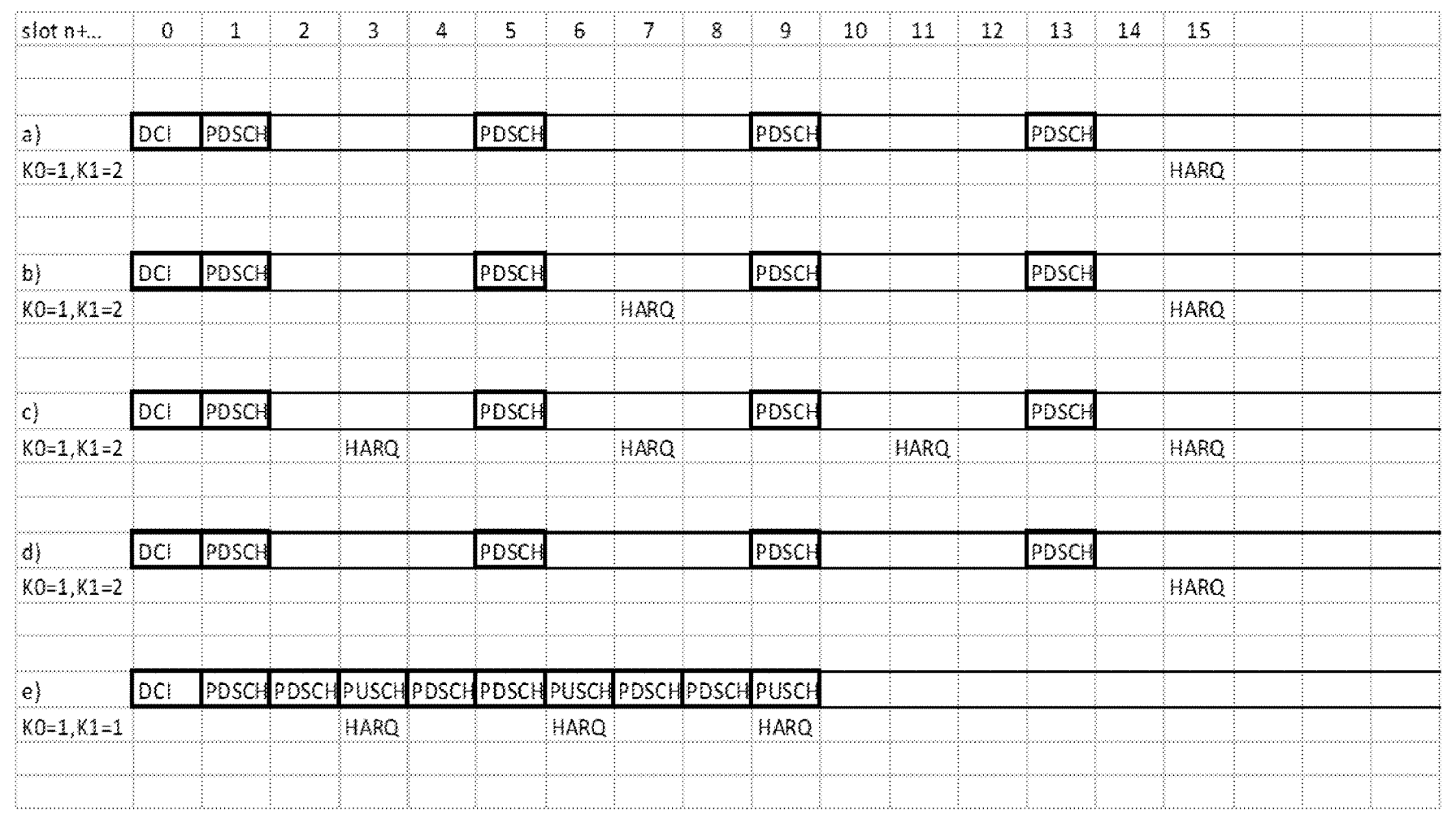

In one or more embodiments, a PUCCH format that supports multiple bits, e.g., format 2/3/4, is used to send multiple ACK/NACK in the same HARQ codebook. In this case a single K1 value may be used to indicate the slot for the PUCCH, and a single PUCCH resource indicator may be used to indicate the PUCCH resource in the indicated slot for the combined HARQ feedback. The K1 value would in this case be relative to a reference slot, typically the last received or scheduled slot of the multi-PDSCH assignment. This method can be used for both frequency division duplex (FDD) and time division duplex (TDD) and may be especially attractive for TDD. This embodiment is illustrated in FIG. 14, row (a) which generally illustrates examples of PUCCH resources in each slot for HARQ feedback where a time/frequency resource within slots are not shown.

A variant of this embodiment is to send multiple ACK/NACK up until a maximum delay. The K1 value would then typically be relative to the first scheduled slot. All slots transmitted early enough to be reported ACK/NACK for at this PUCCH resource may use this PUCCH resource (the required number of slots can be predefined or RRC configured). For all subsequent slots scheduled by the multi-slot DCI, the K1 value may point out or indicate a new PUCCH resource to report ACK/NACK on. This embodiment is illustrated in FIG. 14 row (b).

In one or more embodiments, each slot (or a group of slots if a TB is mapped to a group of slots) corresponds to its own PUCCH transmission. If a single K1 value and PUCCH resource indicator is provided such as via one or more of processing circuitry 68, processor 70, radio interface 62, configuration unit 32, etc., the slot carrying the PUCCH for a TB is K1 slots after the (last) slot carrying the TB. The same PUCCH resource is used in each slot. This embodiment may be especially attractive for FDD because, for each DL slot, a UL slot exists K1 slots later which is not necessarily the case for TDD. This embodiment is illustrated in FIG. 14, row (c).

In one or more embodiments, multiple PUCCH resources in the same slot are used. Here, one K1 value is used to indicate the PUCCH slot for all TBs, relative to a reference slot, typically the last scheduled or received DL slot of the multi-PDSCH assignment. If a single PUCCH resource indicator is provided such as via one or more of processing circuitry 68, processor 70, radio interface 62, configuration unit 32, etc., a rule is used to derive multiple PUCCH resources, e.g., a range of (contiguous or non-contiguous) PUCCH resources starting with the indicated one. This embodiment is illustrated in FIG. 14, row (d).

In one or more embodiments, in cases where a DL/UL configuration is used with more DL than UL, ACK/NACK of all adjacent DL slots are combined together to the same PUCCH resource. This embodiment is illustrated in FIG. 14, row (e).

More flexibility in the resource selection for HARQ feedback can be provided if at least one of K1 value and PUCCH resource indicator is provided for at least one additional slot, in the case one parameter for each (sub-set of) slot. However, this flexibility increases DCI size.

Therefore, as used herein in one or more embodiments, the PUCCH resource indicator is configured to indicate at least one resource where the at least one resource is used for transmitting HARQ feedback and may relate to one or more of: radio resources such as, for example, resource elements, and one or more PUCCH resources.

HARQ Codebook Section

In one or more embodiments, the HARQ codebook section may only be applicable to DL transmissions.

In the HARQ codebook, one entry (1 bit or multiple bits depending on the PDSCH configuration such as multiple-input multiple-output (MIMO), code block group) may be needed per PDSCH. In case of a semi-static configured HARQ codebook (Type 1 codebook), each PDSCH within the HARQ association window is associated with one entry in the HARQ codebook. This principle can be reused, even if there is only one PDCCH scheduling multiple PDSCH.

For the dynamic HARQ codebook (Type 2 codebook), the position of the entry in the HARQ codebook may be derived from the DCI (to be more specific, from the Counter DAI). In cases of a single DCI scheduling multiple PDSCH containing multiple Counter DAI values (one per PDSCH), each Counter DAI may determine the position of the HARQ feedback of the corresponding PDSCH. In cases where the DCI contains a single Counter DAI, the position of the HARQ feedback for all scheduled PDSCH may be derived from the single Counter DAI. For example, the position of the HARQ feedback associated with the first PDSCH is indicated by the Counter DAI and the remaining feedback entries are placed subsequently after the first feedback entry (more general, the Counter DAI together with the number of scheduled PDSCH determines the position in the HARQ codebook of all HARQ feedback entries corresponding to the scheduled PDSCH).

If the HARQ codebook size is not to be increased, bundling can be introduced. For example, instead of providing one feedback entry per PDSCH, feedback for multiple PDSCHs (in the extreme case of all PDSCH scheduled with the single DCI) are combined (for example, typically logically "AND" combined). In this case fewer entries are needed in the HARQ codebook, and the position of the fewer entries can either be indicated by a single Counter DAI value together with a rule or multiple Counter DAI values.

The Counter DAI value indicated in the DCI may be increased by 1 per scheduled PDSCH (and that implies, in existing systems, a per scheduled DL DCI since one DCI schedules one PDSCH). In NR such as in 3GPP Rel-15, the Counter DAI value is represented by two bits and wraps around. When a single DCI schedules multiple PDSCH, the signaled Counter DAI may only be increased by 1 relative to the previous DL assignment DCI, but that the wireless device 22 increases its internal Counter DAI counter by number of scheduled PDSCH, i.e., Counter_DAI_counter_UE=Counter_DAI_counter_UE+nbr_scheduled_PDSCH (as compared to Counter_DAI_counter_UE=Counter_DAI_counter_UE+1, the current behavior). nbr_scheduled_PDSCH is the number of PDSCH scheduled by the multi-PDSCH DCI and follows from the DCI, RRC signaling, MAC CE, or any combination thereof. Increasing the signaled Counter DAI just by 1 relative to the previous DL assignment DCI mitigates the wrap around problem that can occur with a two bit representation. An alternative solution is to increase the bit size of the Counter DAI, either for all DCIs or only for DCIs scheduling multiple PDSCH.

HARQ Process ID Section

In one or more embodiments, the HARQ Process ID section may be applicable to DL and UL transmissions.

In existing systems, the DCI (both in UL and DL) may contain a HARQ process ID to associate the scheduled PxSCH with a HARQ process ID. In one or more embodiments, if a DCI schedules multiple PxSCH, a mapping between the multiple PxSCH and multiple HARQ process IDs is needed. One alternative is to include multiple HARQ process ID into DCIs that schedule multiple PxSCH, this provides increased flexibility at the cost of increased DCI size.

Another option is that the DCI contains fewer HARQ process ID fields than scheduled PxSCH and, in the extreme case, one. In this case, fewer HARQ process ID or IDs is used to derive HARQ process IDs for all scheduled PxSCH. This can be for example that the signaled HARQ process ID together with the number of scheduled PxSCH defines a (contiguous or non-contiguous) range of HARQ process IDs, e.g., with signaled_HARQ_ID=n and nbr_scheduled_PDSCH=4 the four scheduled PxSCH are associated with HARQ process IDs n, n+1, n+2, n+3. If the HARQ process ID exceeds the number of specified/configured HARQ processes, the HARQ process warps around, e.g., n+3→mod(n+3, nbr_HARQ_processes). These four HARQ processes would be associated in a unique mapping with the four scheduled PxSCH, e.g., ($1^{st}$ PxSCH, $2^{nd}$ PxSCH, $3^{rd}$ PxSCH, $4^{th}$ PxSCH)→(HARQ ID n, n+1, n+2, n+3).

In another embodiment, the signaled HARQ process ID and the number of scheduled PxSCH together with the slot number of the scheduled PxSCH determines the HARQ process IDs. For example, a wireless device 22 is scheduled such as by network node 16 with PxSCH in slots $k_1$, $k_2$, $k_3$, and $k_4$ and signaled signaled_HARQ_ID=n, the HARQ process ID for PxSCH in slot $k_i$ is mod($k_i$+n, N) where N is a parameter to ensure the HARQ process ID remains within the configured/specified numbers of HARQ processes, e.g., N=nbr_HARQ_processes.

New Data Indicator Section

In one or more embodiments, the New Data Indicator section may be applicable to DL and UL transmissions.

In existing systems, in the DL, the DCI may contain a New Data Indicator (NDI) field that indicates to the wireless device 22 if a received TB is a new TB or a re-transmission of a TB (associated with the indicated HARQ process ID). In one or more embodiments, the NDI is one bit or in case of MIMO with two transport blocks two bit, one per TB. In UL, the NDI indicates if the wireless device 22 should send a re-transmission of a previous TB (associated with the indicated HARQ process ID) or a new TB.

If the DCI contains only a single (or maybe two in case of MIMO) NDI bits, the same NDI bit is applied to multiple TB. An alternative is to introduce multiple NDI bits in a multi-PxSCH DCI, one NDI bit for each TB (or at least one NDI bit for a group of TBs). In the DL, it can be beneficial to align the NDI configuration with the HARQ bundling configuration, e.g., when a wireless device 22 such as via one or more of processing circuitry 84, processor 86, radio interface 82, control information unit 34, etc. is configured to bundle HARQ feedback of TB1 and TB2 (or PDSCH1 and PDSCH2), a single NDI value for TB1 and TB2 (PDSCH1 and PDSCH2) may be used.

For example, a TB may always be associated with the same HARQ ID during a first transmission and subsequent transmissions. The wireless device 22 (and network node 16) such as via one or more of processing circuitry 84, processor 86, radio interface 82, control information unit 34, etc. may soft-combine the information contained in the different PDSCHs (PUSCHs) of the same HARQ process. If the network node 16 such as via one or more of processing circuitry 68, processor 70, radio interface 62, configuration unit 32, etc. sends a re-transmission, but indicates a different HARQ process ID than in the initial transmission, the wireless device 22 such as via one or more of processing circuitry 84, processor 86, radio interface 82, control information unit 34, etc. may soft-combine the retransmission with what is currently stored in HARQ process ID associated with the initial transmission. However, in one or more embodiments, if the NDI is toggled and indicates new data, no soft-combining may occur.

Therefore, one or more embodiments, provide for HARQ handling for single-DCI multi-slot scheduling. The components and/or processes may be related to and/or include one or more of the following:
PUCCH Resources
HARQ Codebook
HARQ Process ID
New Data Indicator (NDI)

SOME EXAMPLES

Example A1. A network node 16 configured to communicate with a wireless device 22 (WD 22), the network node 16 configured to, and/or comprising a radio interface 62 and/or comprising processing circuitry 68 configured to:
configure downlink control information (DCI), the DCI being configured schedule a plurality of transport blocks over a plurality of communication slots, the scheduling being associated with at least one Hybrid Automatic Repeat Request (HARQ) instance; and
optionally communicate the DCI.

Example A2. The network node 16 of Example A1, wherein the plurality of communication slots are scheduled on the same time and frequency resources of a physical shared channel.

Example A3. The network node 16 of E Example A1, wherein the plurality of communication slots are used to provide a physical downlink shared channel.

Example A4. The network node 16 of Example A1, wherein the at least one HARQ instance corresponds to a plurality of HARQ instances, the plurality of HARQ instance being transmitted using the same HARQ codebook.

Example A5. The network node 16 of Example A1, wherein the HARQ instance is associated with a New Data Indicator (NDI) bit that is applied to the plurality of transport blocks.

Example B1. A method implemented in a network node 16, the method comprising:
configuring downlink control information (DCI), the DCI being configured schedule a plurality of transport blocks over a plurality of communication slots, the scheduling being associated with at least one Hybrid Automatic Repeat Request (HARQ) instance; and
optionally communicate the DCI.

Example B2. The method of Example B1, wherein the plurality of communication slots are scheduled on the same time and frequency resources of a physical shared channel.

Example B3. The method of Example B1, wherein the plurality of communication slots are used to provide a physical downlink shared channel.

Example B4. The method of Example B1, wherein the at least one HARQ instance corresponds to a plurality of HARQ instances, the plurality of HARQ instance being transmitted using the same HARQ codebook.

Example B5. The method Example B1, wherein the HARQ instance is associated with a New Data Indicator (NDI) bit that is applied to the plurality of transport blocks.

Example C1. A wireless device 22 (WD 22) configured to communicate with a network node 16, the WD 22 configured to, and/or comprising a radio interface 82 and/or processing circuitry 84 configured to receive downlink control information (DCI), the DCI being configured schedule a plurality of transport blocks over a plurality of communication slots, the scheduling being associated with at least one Hybrid Automatic Repeat Request (HARQ) instance.

Example C2. The WD 22 of Example C1, wherein the plurality of communication slots are scheduled on the same time and frequency resources of a physical shared channel.

Example C3. The WD 22 of Example C1, wherein the plurality of communication slots are used to provide a physical downlink shared channel.

Example C4. The WD 22 of Example C1, wherein the at least one HARQ instance corresponds to a plurality of HARQ instances, the plurality of HARQ instance being transmitted using the same HARQ codebook.

Example C5. The WD 22 of Example C1, wherein the HARQ instance is associated with a New Data Indicator (NDI) bit that is applied to the plurality of transport blocks.

Example D1. A method implemented in a wireless device 22 (WD 22), the method comprising receiving downlink control information (DCI), the DCI being configured schedule a plurality of transport blocks over a plurality of communication slots, the scheduling being associated with at least one Hybrid Automatic Repeat Request (HARQ) instance.

Example D2. The method of Example D1, wherein the plurality of communication slots are scheduled on the same time and frequency resources of a physical shared channel.

Example D3. The method of Example D1, wherein the plurality of communication slots are used to provide a physical downlink shared channel.

Example D4. The method of Example D1, wherein the at least one HARQ instance corresponds to a plurality of HARQ instances, the plurality of HARQ instance being transmitted using the same HARQ codebook.

Example D5. The method of Example D1, wherein the HARQ instance is associated with a New Data Indicator (NDI) bit that is applied to the plurality of transport blocks.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

3GPP 3$^{rd}$ Generation Partnership Project
5G 5$^{th}$ Generation
BB Baseband
BW Bandwidth
C-DRX/CDRX Connected mode DRX (i.e. DRX in RRC_CONNECTED state)
CRC Cyclic Redundancy Check
DCI Downlink Control Information
DL Downlink
DRX Discontinuous Reception gNB A radio base station in 5G/NR.
GTS Go to sleep
HARQ Hybrid Automatic Repeat Request
IoT Internet of Things
LO Local Oscillator
LTE Long Term Evolution
MAC Medium Access Control
MCS Modulation and Coding Scheme
mMTCmassive MTC (referring to scenarios with ubiquitously deployed MTC devices)
ms millisecond
MTC Machine Type Communication
NB Narrowband
NB-IoT Narrowband Internet of Things
NR New Radio
NW Network
PDCCH Physical Downlink Control Channel
PDSCH Physical Downlink Shared Channel
RF Radio Frequency
RNTI Radio Network Temporary Identifier
RRC Radio Resource Control
RX Receiver/Reception
SSB Synchronization Signal Block
T/F Time/Frequency
TX Transmitter/Transmission
UE User Equipment
UL Uplink
WU Wake-up
WUG Wake-up Group
WUR Wake-up Radio/Wake-up Receiver
WUS Wake-up Signal/Wake-up Signaling It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

The invention claimed is:

1. A network node comprising processing circuitry configured to:
cause transmission of downlink control information (DCI) to a wireless device, the DCI including information for scheduling two or more transport blocks (TBs) over two or more communication slots, the two or more TBs being associated with two or more Hybrid Automatic Repeat Request (HARQ) process identifiers (IDs), the information for scheduling including at least a HARQ process ID indicator indicating at least other HARQ process IDs, the HARQ process ID indicator being based at least in part on a quantity of the two or more communication slots for physical shared channel transmission; and
communicate using the two or more TBs based at least in part on the DCI.

2. The network node of claim 1, wherein one or more of:
the information for scheduling further includes one or both of:
a physical uplink control channel (PUCCH) resource indicator configured to indicate at least one resource for the wireless device to use for transmitting HARQ feedback related to the two or more TBs; and
one or more New Data Indicators (NDIs) configured to indicate whether at least one of the two or more TBs is a retransmission; and
the PUCCH resource indicator includes one or more K1 values.

3. The network node of claim 1, wherein the two or more communication slots are scheduled on corresponding time and frequency resources.

4. The network node of claim 1, wherein one or both of:
the information for scheduling further includes a Downlink Assignment Indicator (DAI) configured to indicate a position of HARQ feedback related to the two or more TBs, in a HARQ codebook; and
the position of HARQ feedback related to the two or more TBs, in the HARQ codebook, is further based at least in part on the quantity of the two or more communication slots.

5. The network node of claim 4, wherein a value of the DAI indicates the position of HARQ feedback for one of the two or more TBs, another position of HARQ feedback for a second of the two or more TBs being indicated based at least in part on the value of the DAI.

6. A method in a network node, the method comprising:
causing transmission of downlink control information (DCI) to a wireless device, the DCI including information for scheduling two or more transport blocks (TBs) over two or more communication slots, the two or more transport blocks are associated with two or more Hybrid Automatic Repeat Request (HARQ) process identifiers (IDs), the information for scheduling including a HARQ process ID indicator indicating at least other HARQ process IDs, the HARQ process ID indicator being based at least in part on a quantity of the two or more communication slots for physical shared channel transmission; and
communicating using the two or more TBs based at least in part on the DCI.

7. The method of claim 6, wherein one or more of:
the information for scheduling further includes one or both of:
a physical uplink control channel (PUCCH) resource indicator configured to indicate at least one resource for the wireless device to use for transmitting HARQ feedback related to the two or more TBs; and
one or more New Data Indicators (NDIs) configured to indicate whether at least one of the two or more TBs is a retransmission; and
the PUCCH resource indicator includes one or more K1 values.

8. The method of claim 6, wherein the two or more communication slots are scheduled on corresponding time and frequency resources.

9. The method of claim 6, wherein one or both of:
the information for scheduling further includes a Downlink Assignment Indicator (DAI) configured to indicate a position of HARQ feedback related to the two or more TBs, in a HARQ codebook; and
the position of HARQ feedback related to the two or more TBs, in the HARQ codebook, is further based at least in part on the quantity of the two or more communication slots.

10. The method of claim 9, wherein a value of the DAI indicates the position of HARQ feedback for one of the two or more TBs, another position of HARQ feedback for a second of the two or more TBs being indicated based at least in part on the value of the DAI.

11. A wireless device comprising processing circuitry configured to:
receive downlink control information (DCI), the DCI including information for scheduling two or more transport blocks (TBs) over two or more communication slots, the two or more transport blocks are associated with two or more Hybrid Automatic Repeat Request (HARQ) process identifiers (IDs), the information for scheduling including at least a HARQ process ID indicator indicating at least other HARQ process IDs, the HARQ process ID indicator being based at least in part on a quantity of the two or more communication slots for physical shared channel transmission; and communicate using the two or more TBs based at least in part on the DCI.

12. The wireless device of claim 11, wherein one or more of:

the information for scheduling further includes one or both of:

a physical uplink control channel (PUCCH) resource indicator configured to indicate at least one resource for the wireless device to use for transmitting HARQ feedback related to the two or more TBs; and one or more New Data Indicators (NDIs) configured to indicate whether at least one of the two or more TBs is a retransmission; and the PUCCH resource indicator includes one or more K1 values.

13. The wireless device of claim 11, wherein the two or more communication slots are scheduled on corresponding time and frequency resources.

14. The wireless device of claim 11, wherein one or both of:

the information for scheduling further includes a Downlink Assignment Indicator (DAI) configured to indicate a position of HARQ feedback related to the two or more TBs, in a HARQ codebook; and the position of HARQ feedback related to the two or more TBs, in the HARQ codebook, is further based at least in part on the quantity of the two or more communication slots.

15. The wireless device of claim 14, wherein a value of the DAI indicates the position of HARQ feedback for one of the two or more TBs, another position of HARQ feedback for a second of the two or more TBs being indicated based at least in part on the value of the DAI.

16. A method implemented by a wireless device, the method comprising:

receiving downlink control information (DCI), the DCI including information for scheduling two or more transport blocks (TBs) over two or more communication slots, the two or more transport blocks are associated with two or more Hybrid Automatic Repeat Request (HARQ) process identifiers (IDs), the information for scheduling including at least a HARQ process ID indicator indicating at least other HARQ process IDs, the HARQ process ID indicator being based at least in part on a quantity of the two or more communication slots for physical shared channel transmission; and communicating using the two or more TBs based at least in part on the DCI.

17. The method of claim 16, wherein one or more of:

the information for scheduling further includes one or both of:

a physical uplink control channel (PUCCH) resource indicator configured to indicate at least one resource for the wireless device to use for transmitting HARQ feedback related to the two or more TBs; and one or more New Data Indicators (NDIs) configured to indicate whether at least one of the two or more TBs is a retransmission; and the PUCCH resource indicator indicating includes one or more K1 values.

18. The method of claim 16, wherein the two or more communication slots are scheduled on corresponding time and frequency resources.

19. The method of claim 16, wherein one or both of:

the information for scheduling further includes a Downlink Assignment Indicator (DAI) configured to indicate a position of HARQ feedback related to the two or more TBs, in a HARQ codebook; and the position of HARQ feedback related to the two or more TBs, in the HARQ codebook, is further based at least in part on the quantity of the two or more communication slots.

20. The method of claim 19, wherein a value of the DAI indicates the position of HARQ feedback for one of the two or more TBs, another position of HARQ feedback for a second of the two or more TBs being indicated based at least in part on the value of the DAI.

* * * * *

UNITED STATES PATENT AND TRADEMARK OFFICE
CERTIFICATE OF CORRECTION

PATENT NO. : 12,101,781 B2  
APPLICATION NO. : 17/420188  
DATED : September 24, 2024  
INVENTOR(S) : Baldemair et al.

Page 1 of 3

It is certified that error appears in the above-identified patent and that said Letters Patent is hereby corrected as shown below:

In the Drawings

In Fig. 9, Sheet 7 of 10, for Tag "S134", Line 1, delete "configured" and insert -- configured to --, therefor.

In Fig. 10, Sheet 7 of 10, and on the title page, the illustrative print figure, for Tag "S138", Line 8, delete "Indicator" and insert -- Index --, therefor.

In Fig. 11, Sheet 8 of 10, for Tag "S142", Line 1, delete "configured" and insert -- configured to --, therefor.

In Fig. 12, Sheet 8 of 10, for Tag "S144", Line 8, delete "Indicator" and insert -- Index --, therefor.

In the Specification

In Column 1, Line 64, delete "SIB 1." and insert -- SIB1. --, therefor.

In Column 2, Lines 21-22, delete " $\lceil \log_2(N_{RB}^{DL,BWP}(N_{RB}^{DL,BWP}+1)/2 \rceil$ " and insert -- $\lceil \log_2(N_{RB}^{DL,BWP}(N_{RB}^{DL,BWP}+1)/2) \rceil$ --, therefor.

In Column 3, Line 53, delete "Indicator" and insert -- Index --, therefor.

In Column 4, Line 28, delete "caused of" and insert -- caused by --, therefor.

In Column 4, Line 39, delete "Indicator" and insert -- Index --, therefor.

In Column 5, Line 25, delete "Indicator" and insert -- Index --, therefor.

In Column 6, Line 10, delete "Indicator" and insert -- Index --, therefor.

Signed and Sealed this  
Sixth Day of May, 2025

Coke Morgan Stewart  
*Acting Director of the United States Patent and Trademark Office*

CERTIFICATE OF CORRECTION (continued)
U.S. Pat. No. 12,101,781 B2

In Column 8, Line 59, delete "(RRU)" and insert -- (RRU), --, therefor.

In Column 9, Line 13, delete "equipped" and insert -- equipment --, therefor.

In Column 9, Line 24, delete "(RRU)" and insert -- (RRU), --, therefor.

In Column 9, Line 50, delete "described" and insert -- describe --, therefor.

In Column 10, Line 25, delete "Wide Band" and insert -- Wideband --, therefor.

In Column 10, Line 52, delete "(HARM)" and insert -- (HARQ) --, therefor.

In Column 12, Line 21, delete "Circuitry)" and insert -- Circuit) --, therefor.

In Column 12, Line 59, delete "and or" and insert -- and/or --, therefor.

In Column 13, Line 27, delete "Circuitry)" and insert -- Circuit) --, therefor.

In Column 14, Line 7, delete "Circuitry)" and insert -- Circuit) --, therefor.

In Column 18, Line 5, delete "Indicator" and insert -- Index --, therefor.

In Column 18, Line 60, delete "configured schedule" and insert -- configured to schedule --, therefor.

In Column 19, Line 29, delete "Indicator" and insert -- Index --, therefor.

In Column 21, Line 14, delete "for at" and insert -- for --, therefor.

In Column 22, Line 17, delete "general," and insert -- generally, --, therefor.

In Column 22, Line 38, delete "but that" and insert -- but --, therefor.

In Column 24, Line 18, delete "configured schedule" and insert -- configured to schedule --, therefor.

In Column 24, Line 42, delete "configured schedule" and insert -- configured to schedule --, therefor.

In Column 24, Line 64, delete "configured schedule" and insert -- configured to schedule --, therefor.

In Column 25, Lines 16-17, delete "configured schedule" and insert -- configured to schedule --, therefor.

In Column 27, Line 1, delete "5G/NR." and insert -- 5G/NR --, therefor.

CERTIFICATE OF CORRECTION (continued)
U.S. Pat. No. 12,101,781 B2

In the Claims

In Column 28, Line 8, in Claim 4, delete "Indicator" and insert -- Index --, therefor.

In Column 28, Line 52, in Claim 9, delete "Indicator" and insert -- Index --, therefor.

In Column 29, Line 34, in Claim 14, delete "Indicator" and insert -- Index --, therefor.

In Column 30, Line 33, in Claim 19, delete "Indicator" and insert -- Index --, therefor.